United States Patent [19]
Chintis

[11] Patent Number: 5,829,918
[45] Date of Patent: Nov. 3, 1998

[54] METHOD AND APPARATUS FOR REMEDIATING CONTAMINATION IN SOILS

[76] Inventor: Candice Chintis, HCR 2, Box 422, Tucson, Ariz. 85735

[21] Appl. No.: 217,946

[22] Filed: Mar. 24, 1994

[51] Int. Cl.$^6$ ...................................................... B09B 3/00
[52] U.S. Cl. ........................................... 405/128; 166/246
[58] Field of Search .................................... 405/128–131; 166/246, 245

[56] References Cited

U.S. PATENT DOCUMENTS

| | | | |
|---|---|---|---|
| 4,401,569 | 8/1983 | Jhaveri et al. ....................... | 405/128 X |
| 4,685,515 | 8/1987 | Huang et al. ........................ | 166/245 X |
| 4,850,745 | 7/1989 | Hater et al. .......................... | 405/128 X |
| 5,076,727 | 12/1991 | Johnson et al. ......................... | 405/128 |
| 5,120,160 | 6/1992 | Schwengel . | |
| 5,133,625 | 7/1992 | Albergo et al. . | |
| 5,178,491 | 1/1993 | Graves et al. . | |
| 5,190,405 | 3/1993 | Vinegar et al. .......................... | 405/128 |
| 5,211,230 | 5/1993 | Ostapovich et al. .................... | 166/245 |
| 5,221,159 | 6/1993 | Billings et al. . | |
| 5,228,804 | 7/1993 | Balch ................................... | 405/131 X |
| 5,246,309 | 9/1993 | Hobby . | |
| 5,249,888 | 10/1993 | Braithwaite et al. . | |
| 5,265,978 | 11/1993 | Losack ................................ | 405/131 X |
| 5,279,740 | 1/1994 | Basile et al. ......................... | 166/246 X |
| 5,325,795 | 7/1994 | Nelson et al. ........................ | 405/128 X |
| 5,348,422 | 9/1994 | Manchak, III et al. ................ | 405/128 |
| 5,384,048 | 1/1995 | Hazen et al. ......................... | 405/128 X |

OTHER PUBLICATIONS

Timothy J. Mayotte; Subsurface Volatilization . . . Voc Contamination; Nov./Dec. 1993.
Analysis Monitoring Remediation Soils; Jun./Jul. 1993; pp. 46–49.

Primary Examiner—Dennis L. Taylor
Assistant Examiner—Frederick L. Lagman
Attorney, Agent, or Firm—Gudrun E. Huckett

[57] ABSTRACT

In a method of remediating contamination in soils of the vadose zone at least one injection well and at least one extraction well are established in the soil. Oxygen-containing gas such as air is injected into the injection well. A vacuum is applied to the extraction well for extracting the air together with volatile contaminants through the extraction well. The air and volatile contaminants are returned into the injection well. A biological medium containing microbes is continuously added to the air to be returned into the injection well for introducing the biological medium into the soil. The apparatus for remediating contamination in soils of the vadose zone includes at least one injection well and at least one extraction well to be placed in the soil. The apparatus has a device for injecting air into the injection well. A device for applying a vacuum to the extraction well for extracting the air together with volatile contaminants is provided. A return line connects the extraction well to the injection well for returning the air and volatile contaminants into the injection well. The apparatus also has a device for continuously adding to the air a biological medium for introduction into the soil.

51 Claims, 5 Drawing Sheets

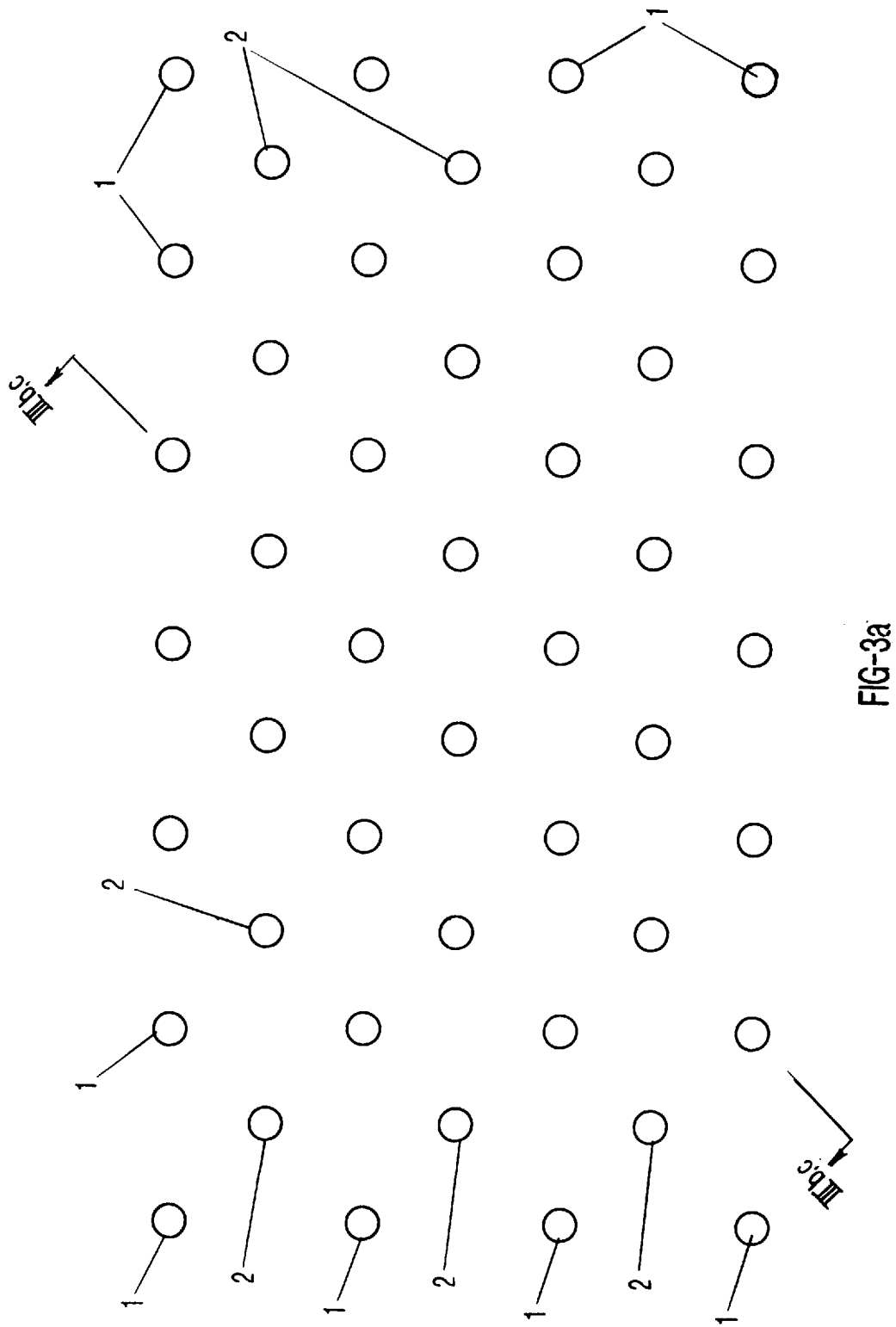

METHOD AND APPARATUS FOR REMEDIATING CONTAMINATION IN SOILS

BACKGROUND OF THE INVENTION

The present invention relates to a method of remediating contamination, especially petroleum-based hydrocarbon contamination, in soils, in particular in the vadose zone.

The remediation of contaminated soils has become more and more important in recent years with the advent of more stringent environmental laws. A particular problem is the contamination with petroleum products such as gasoline, diesel fuel, and heating oil, in particular due to leakage from underground storage tanks. Contamination is also caused by spills and improper disposal of petroleum hydrocarbons. Due to stricter regulations on the federal and state level, the clean-up of such contaminated sites has become a rapidly growing industry in the country.

In addition to petroleum-based products contamination may include other organic products such as halogenated hydrocarbons, e.g., polychlorinated biphenyls, trichlorethylene, carbon tetrachloride, and methylene chloride, which have been extensively used for many years as degreaser's and cleaning agents. Of particular importance are also alcohols, ketones, esters, aromatics, olefins, alkanes etc. which have been widely used in industry and can be found in various contaminated sites.

Research and development in the field of environmental technologies has produced various techniques for the purpose of remediation. Presently employed techniques are: excavation of contaminated soil with subsequent land farming or landfill deposition, and vacuum extraction in which volatile components are removed from the soil by applying a vacuum. Excavation and land farming are two very expensive means of remediation due to the use of heavy equipment and the time factor involved. Vacuum extraction requires treatment of volitiles or venting to the atmosphere, is time-consuming and thus also very expensive.

A method and apparatus for remediating contamination in the vadose zone and in ground water is disclosed in U.S. Pat. No. 5,221,159. This particular method uses injection wells that extend through the vadose zone below the groundwater table. Extraction wells are established above the groundwater table in the vadose zone. Oxygen, preferably in the form of air, is injected via the injection wells and a vacuum is applied to the extraction wells. The injection of air is used to increase the activity of indigenous microbes and also air-strip the soil. The introduction of nutrients into the soil is also suggested. It is also contemplated to collect, select, and culture suitable microbes from the contaminated site for remediation of the particular contamination at the site and reinject the cultured microbes to enhance bioremediation within the soil. Accordingly, the described process stimulates indigenous microbes at the site or uses cultured indigenous microbes that are added to the soil in a batch application and are then further stimulated to improve degradation rates. The system describes extraction with venting of the extracted gases.

U.S. Pat. No. 5,246,309 relates to a system and method in which contaminated soil gas is removed from the soil, the contaminants are separated from the gas and treated in a bioreactor with microorganisms. The residual gas is returned into the soil and residual contaminants within the residual gas are remediated in the vadose zone or groundwater zone by naturally occurring bacteria. Treatment of the contamination in the soil by microorganisms is not suggested.

From U.S. Pat. No. 5,249,888 a system is known in which a combination of injection and extraction wells is used to extract fluids and contaminants from the soil. With the injection wells steam or heated air is injected into the soil, the steam/heated air front washes or flushes the soil and removes contaminants through the extraction well. No bioremediation is suggested.

U.S. Pat. No. 5,120,160 relates to a process for treating hydrocarbon-contaminated soils and groundwater. The process combines excavating/land farming of contaminated soils and the introduction of hydrocarbon-consuming microorganisms into the soil that is not to be excavated. Bacteria are introduced in dry form into the wells, the wells are filled with water, and a single burst of pressure is applied to inject the bacteria/water mixture into the soil. Again, a batch application of the microbes is suggested.

Another in-situ remediation system is disclosed in U.S. Pat. No. 5,178,491 wherein nutrients in the vapor face are introduced into the soil for use by microorganisms present at the site. A delivery system consisting of wells connected by a manifold is installed into the ground. A supply tank contains the nutrient in aqueous solution. Air is bubbled through the supply tank to vaporize the nutrients and the air stream carrying the nutrients is then introduced into the soil via the wells. The air stream is circulated through the soil by applying a vacuum at the central well. Recirculation of the extracted air is possible with a return line. The disclosed method essentially relies on stimulating indigenous bacteria/microorganisms.

From U.S. Pat. No. 5,133,625 an apparatus with a cylindrical rod that is pneumatically driven into the ground with its pointed head is know. A supply tank is connected with an umbilical cord to the head of the cylindrical rod. The supply tank contains a fluid that is preferably a mixture or microorganisms and nutrients. This fluid and optionally also gas such as oxygen is pumped through the head into the ground to be remediated. A return system is not contemplated.

In all of the above described methods in which bioremediation is used, indigenous bacteria are stimulated by providing nutrients and oxygen. In all of the systems, a batch-wise introduction of cultured bacteria/microorganisms is suggested.

It is an object of the present invention to provide a bioremediation system/apparatus and a bioremediation method for contamination in the vadose zone, i.e., above the groundwater table. The apparatus should be easy and simple to install, inexpensive and compact, and provide for a closed system so that contaminants cannot escape into the atmosphere or, alternatively, must not be trapped or scrubbed from the exhaust air, and provide for an accelerated remediation.

DESCRIPTION OF THE DRAWING

This object, and other objects and advantages of the present invention, will appear more clearly from the following specification in conjunction with the accompanying drawings in which.

SUMMARY OF THE INVENTION

Figure 1:
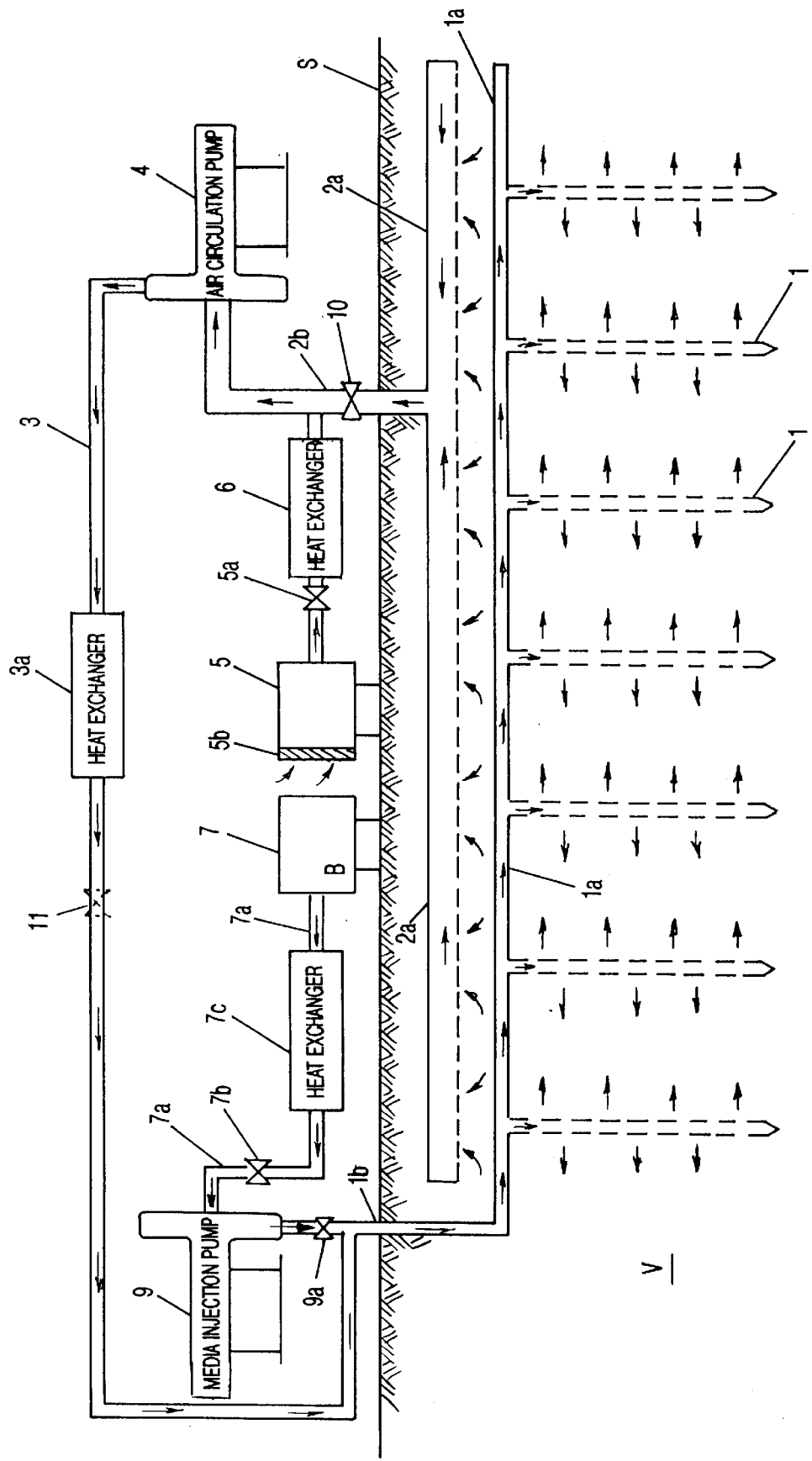
FIG. 1 shows schematically the remediation system of the present invention.

The method of remediating contamination in soils in the vadose zone is primarily characterized by the following steps:

Establishing at least one injection well in the soil;

Establishing at least one extraction well in the soil;

Injecting oxygen-containing gas into the injection well;

Applying a vacuum to the extraction well and extracting the oxygen-containing gas together with contamination volatiles, when present in the contamination, through the extraction well;

Returning the oxygen-containing gas together with contamination volatiles, when present in the contamination, as a return gas into the injection well, and subsequently to the vadose soils; and Continuously adding to the return gas introduced into the injection well a biological medium for introduction into the soil.

Preferably, the inventive method further comprises the step of heating the oxygen-containing gas before the step of injecting oxygen-containing gas into the injection well.

Advantageously, the method further comprises the step of heating the biological medium before the step of continuously adding a biological medium.

Expediently, the method further comprises the step of preparing an aqueous solution of the biological medium, wherein the step of continuously adding biological medium includes the step of atomizing the aqueous solution of the biological medium.

In a preferred embodiment of the present invention, the method further comprises the step of heating the return gas.

Advantageously, a primary component of the biological medium are microbes specifically designed to feed on the contaminants of the contamination. The contaminants are preferably petroleum hydrocarbons and the microbes feed on the petroleum hydrocarbons.

Advantageously, the step of returning the return gas (oxygen-containing gas and contamination volatiles, if present) includes the step of introducing virgin oxygen-containing gas into the return gas. Preferably, the method further comprises the step of heating the virgin oxygen-containing gas. Advantageously, the oxygen-containing gas is air, whereby the air is preferably filtered at the air intake.

In another embodiment of the present invention, the method further comprises the step of supplying nutrients for the biological medium to the return gas.

Preferably, an aqueous solution of the nutrients is prepared and the step of supplying nutrients includes the step of atomizing the aqueous solution of the nutrients. Expediently, the nutrients are heated before the step of supplying them into the oxygen-containing gas.

Advantageously, the method further comprises the step of monitoring progress of the remediation. Monitoring preferably includes the step of sampling the return gas.

Expediently, the method further comprises the steps of arranging a plurality of injection wells in a grid structure and connecting the plurality of injection wells to at least one common inlet line. Preferably, the method further comprises the step of positioning the extraction well above the injection wells and connecting substantially horizontally extending extraction lines to the extraction well to substantially cover the area of the grid structure.

Advantageously, the step of arranging a plurality of injection wells includes the step of placing the injection wells so as to define the corners of a polygon, and the method further comprises the step of positioning the extraction well in the center of the polygon. Advantageously, the method further comprises the step of extending the extraction well vertically to a same level as the free ends of the injection wells. In the alternative, the extraction well may terminate above the level of free ends of the injection wells.

Preferably, the step of arranging a plurality of injection wells includes the step of placing the injection wells in parallel rows. The method further comprises the step of positioning a plurality of the extraction wells in rows between adjacent ones of the parallel rows so as to be spaced uniformly from the injection wells of the adjacent rows. Preferably, the extraction wells extend vertically to a same level as free ends of the injection wells. In the alternative, the extraction wells may terminate above a level of free ends of the injection wells.

Advantageously, the method further comprises the step of introducing moisture into the return gas.

In a preferred embodiment, the step of establishing at least one injection well includes placing the injection well into the vadose zone at the contamination site and the step of establishing at least one extraction well includes placing the extraction well into the vadose zone at the contamination site.

Preferably, the method further comprises the steps of excavating the contaminated soil and filling the contaminated soil into a containment structure before the step of establishing at least one injection well and establishing at least one extraction well. The containment structure may be a container or a landfarm structure.

The present invention further relates to an apparatus for remediating contamination in soils in the vadose zone, whereby the apparatus according to the present invention is primarily characterized by:

At least one injection well to be placed in the soil;

At least one extraction well to be placed in the soil;

Means for injecting oxygen-containing gas into the injection well;

Means for applying a vacuum to the extraction well and extracting the oxygen-containing gas together with contamination volatile, when present in the contamination, through the extraction well;

A return line connecting the extraction well to the injection well for returning the oxygen containing gas together with contamination volatiles, when present in the contamination, as a return gas into the injection well; and Means for continuously adding to the return gas to be returned into the injection well and the soil a biological medium for introduction into the soil.

Preferably, the apparatus further comprises a heat exchanger connected within the return line for heating the return gas.

Preferably, the apparatus further comprises a means for heating the biological medium.

Expediently, the apparatus further comprises a reservoir for holding the biological medium, preferably in the form of an aqueous solution, and a connecting line for connecting the reservoir to the return line, wherein the connecting line has a jet valve for injecting the biological medium, in particular, atomizing an aqueous solution of the biological medium, into the return line.

Expediently, the apparatus further comprises an air intake with a filter connected to the return line, wherein the oxygen-containing gas is air. Preferably a further heat exchanger is connected between the air intake and the return line.

Preferably, the biological medium comprises primarily microbes specifically designed to feed on the contaminants of the contamination. The contaminants are preferably petroleum hydrocarbons and the microbes feed on the petroleum hydrocarbons.

Advantageously, the return line has a port for supplying nutrients. The apparatus includes a reservoir for the nutrients connected to the port, wherein the reservoir has a means for heating the nutrients and the port has a jet valve for injecting the nutrients, i.e., atomizing the nutrients when supplied in aqueous form.

Advantageously, the return line has an access port for monitoring.

In a preferred embodiment of the present invention, a plurality of injection wells is arranged in a grid structure, and at least one common inlet line is connected to the injection wells.

The extraction well may be positioned above the injection wells and comprises substantially horizontally extending extraction lines substantially covering the area of the grid structure.

Preferably, the injection wells are placed so as to define the corners of a polygon and the extraction well is positioned in the center of the polygon. Advantageously, the extraction well extends vertically to a same level as the free ends of the injection wells. In the alternative, the extraction well terminates above a level of free ends of the injection wells.

In another embodiment of the present invention, the injection wells are placed in parallel rows and a plurality of extraction wells are positioned in rows between adjacent ones of the parallel rows so as to be spaced uniformly from the injection wells of the adjacent parallel rows. Preferably, the extraction wells extend vertically to a same level as the free ends of the injection wells. Alternatively, the extractions wells terminate above a level of free ends of the injection wells.

Advantageously, the return line has a port for introducing moisture into the return gas. This port may be the same port as the port used for supplying nutrients or an additional port.

In a preferred embodiment of the present invention, the at least one injection well is placed into the vadose zone at the contamination site and the at least one extraction well is placed into the vadose zone at the contamination side.

Advantageously, the apparatus further comprises a containment structure for receiving the soil and the at least one injection well and the at least one extraction well. The containment structure may be a container or a landfarm structure.

The present invention provides a substantially closed system with which heated air containing microorganisms and optionally moisture and nutrients is injected into the soil via injection wells, extracted from the soil by vacuum through extraction wells, and returned into the injection wells. Instead of venting the extracted air into the atmosphere, the extracted air and volatile contaminants which may be present are returned through a return line into the injection well(s). A substantially closed system is provided.

An important feature of the present invention is the continuous introduction of biological medium into the stream of heated air injected into the soil. The term "biological medium" in the present invention is used to describe any preparation, solution, medium, slurry, suspension etc. in liquid or gaseous form that contains microorganisms. In this context, the term "aqueous solution" refers to any form of dispersed microorganisms in a water base. The biological medium may contain in addition to the microbes a system of nutrients or other components that enhance the activity of the microbes in any chemical, biological or physical manner.

By continuously injecting microorganisms or microbes into the soil it is ensured that there is always a constant and sufficient amount of contaminant-consuming microbes, preferably hydrocarbon-consuming microbes, present in the soil. The disadvantages of the prior art, i.e., the slowdown of remediation at the end of the remediation cycle due to exhaustion of the microbes and the contaminants (essentially the primary food source for the microbes) present in the soil, are thus eliminated. Furthermore, by recirculating the air through a substantially closed system volatile components of the contamination in the soil are not released into the atmosphere, respectively, there is no need to trap or scrub the volatile contaminants from the exhaust gas, which would otherwise present further environmental problems, and are instead reintroduced into the soil where they can be degraded by the microbes. This system effectively makes the vadose soils a medium for the treatment of contaminants, preferably petroleum hydrocarbons.

A further advantage of the present invention is that the recirculated air (return gas) is heated and thus kept at a constant temperature that is favorable to microbial activity.

It is also suggested that, if desired, nutrients can be introduced into the soil to further enhance the activity of the microbes. For the same purpose it is also possible to introduce moisture into the system to guarantee a constant moisture content for the microbes which need water for digestion and degradation of the contaminants.

The microbes to be used with the present invention are preferably commercially available microbes that are designed to feed on specific contaminations or are able to degrade a broad range of contaminants. Various strains of microbes are known to a person skilled in the art that are particularly suitable for remediating hydrocarbons, respectively, petroleum products. A product containing a wide variety of microbes is, for example, available from Probiotic Solutions, Tempe, Ariz., under the tradename Micatrol. A series of products under the tradename M-1000 containing combinations of different strains of bacteria is available from Micro-Bac International, Austin, Tex.

The oxygen-containing gas to be introduced into the soil is preferably air. For this purpose, air is provided to the substantially closed recirculating system via an air intake that is provided with a filter. The air sucked into the system is preferably heated with a heat exchanger before entering the return line. Once the desired amount of air has been introduced into the system and the desired amount of air flow is ensured within the closed system, the air intake is regulated and used only to supplement air loss within the circulating stream of air in the system.

In order to monitor the progress of the remediation system, the return line is provided with one or more access ports through which samples of the air stream (return gas) can be taken and through which temperature, oxygen and moisture content of the air, or the nutrient content, can be monitored. The air stream will contain volatile components of the contamination which can be analyzed and monitored. This may be used as an initial indication of the progress of the remediation process.

The injection and extraction wells can be positioned in various arrangements, for example, can be placed for small contamination sites so as to have one extraction well surrounded by injection wells positioned on the corners of a polygon. It is also possible to position the injection wells in a grid structure below the extraction well or wells which in this case comprises extraction lines covering the area of the grid structure of the injection wells and end in at least one common extraction well. In the alternative it is also possible to arrange a plurality of injection wells in parallel rows with a plurality of extraction wells in rows positioned between adjacent parallel rows of injection wells so as to be spaced uniformly from the injection wells of the adjacent rows. When the extraction well or wells are positioned between the injection wells, they may terminate above the free end of the injection well or may extend to the level of the free ends of the injection wells.

The method as disclosed may be used at the contamination site by placing the injection wells and extraction wells directly into the contaminated soil in the vadose zone. In the alternative, it is also possible, for example, when it is not feasible to install a remediation system at the site, to excavate the contaminated soil and place it into a containment structure such as a container or place it into a conventional landfarm structure that is enclosed by conventional means known to a person skilled in the art. The injection and extraction wells are then placed into the soil within the containment structure.

The inventive apparatus is comprised of one or more injection wells and one or more extraction wells depending on the size of the contaminated site whereby the outlet of the extraction well(s) is connected with a return line to the inlet of the injection well(s). Within the return line an air circulation pump is provided for injecting air into the soil via the injection wells and for extracting the air from the soil via the extraction wells and returning the extracted air (return gas) to the injection wells. The apparatus thus substantially provides for a closed system, i.e., the extracted air is not vented into the atmosphere, but returned into the injection well(s) so that volatile contaminants that have been extracted from the soil are reintroduced into the soil to be further remediated.

The apparatus further comprises a means for continuously adding to the oxygen-containing gas (return gas) to be injected (returned) into the injection well a biological medium for introduction into the soil. Such a means for continuously adding the biological medium is preferably a medium injection pump that is connected to a biological medium reservoir, whereby the biological medium is preferably heated in the tank or in the line to the injection pump, for example, by a heat exchanger. The injection pump has a jet nozzle for injecting, i.e., atomizing, the biological medium, preferably an aqueous solution, into the return air stream to be returned (injected) into the injection wells.

The biological medium to be used with the present invention is preferably a commercially available strand of microbes that has been cultured for digesting either a particular or a wide range of contaminants. For example, microbes can be used that are specifically designed for the digestion of petroleum products, respectively, hydrocarbons. Such microbes or bacteria are commercially available from various sources as indicated above. The bacteria or microbes are preferably suspended in an aqueous solution for injection into the air stream.

The gist of the present invention is to supply a continuous stream of biological medium (microbes) into the soil. This ensures that at any time during the remediation process a sufficient number of bacteria is always present within the soil. It has been observed in the past that the population of microbes, be it naturally present or cultured indigenous microbes added to the soil, at the contamination site naturally decreases over time due to exhaustion of the contaminants and/or microbes at the site. The present invention prevents this natural decrease in population by continuously adding new microbes to the soil. This ensures a bioremediation process which is fast and operates at a constant rate without the previously observed slowdown.

The return line preferably has a heat exchanger for heating the return gas, i.e., the oxygen containing gas that is recirculated within the system to a suitable temperature at which the microbial activity within the soil is optimal. The heat exchanger within the return line ensures that the oxygen-containing gas extracted from the soil, which has been cooled by passing through the soil, is brought back to the desired temperature so that eventually the entire system, and especially the soil to be remediated, is kept at a constant temperature favorable to the microbial activity.

The oxygen-containing gas to be used with the present invention is preferably air. The apparatus thus has an air intake that is preferably equipped with an air filter. Between the air intake and the return line a heat exchanger is preferably provided so that the intake air before entering the return line is already brought up to the desired bioremediation temperature. Of course, it is also possible to rely exclusively on the heat exchanger positioned within the return line for heating the return air and the newly introduced (virgin) air to the desired temperature.

The return line may be provided with one or more access ports for monitoring the progress of the remediation. For example, it is possible to withdraw an air sample, respectively gas sample, from the return line to determine the amount of volatile contaminants within the air stream. This will give a good indication of the progress of the remediation process.

The return line may further be provided with a port for introducing nutrients into the air stream. The nutrients should preferably also be supplied in the form of an aqueous solution and be injected, respectively, atomized for introduction into the air stream. The required nutrients may be contained in the biological medium.

Another important feature of the present invention is the introduction of moisture into the air stream so as to provide a constant moisture content of the soil to be remediated. Since moisture is an important factor in the degradation process of the contaminants by the microbes, it is important that a sufficient level of moisture is provided in order to maintain a constant level of decomposition of the contaminants. Moisture may be supplied with the biological medium and/or the addition of nutrients, but may also be added separately.

Figure 2A:
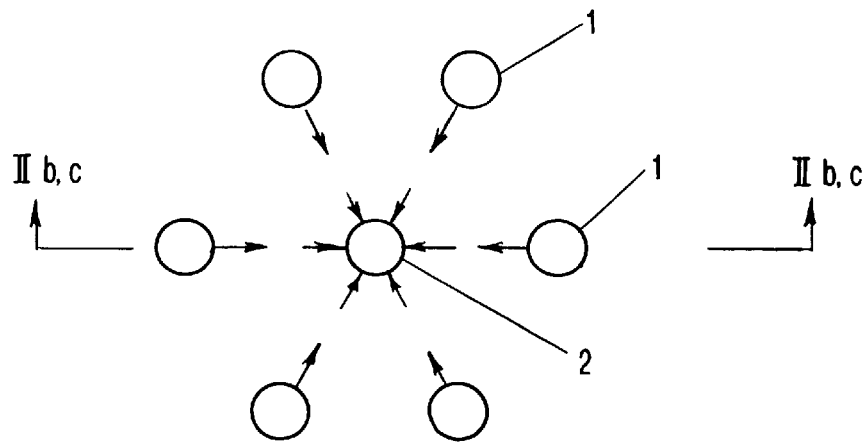
FIG. 2a shows schemactically a polygonal arrangement of 6 injection wells and 1 extraction well.
Figure 2B:
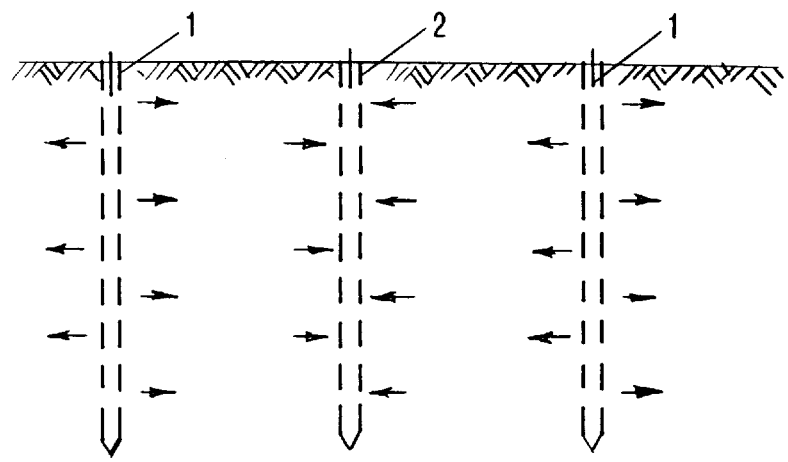
FIGS. 2b, c show a section along line II representing an extraction well that is of the same length, respectively, shorter than the extraction well.
Figure 2C:
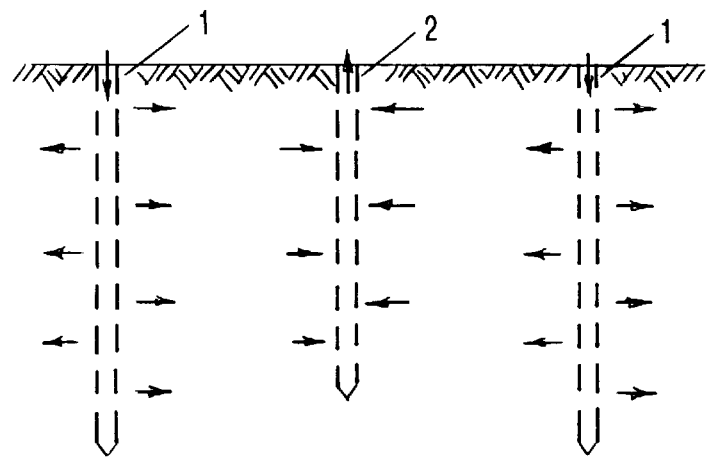
Figure 3B:
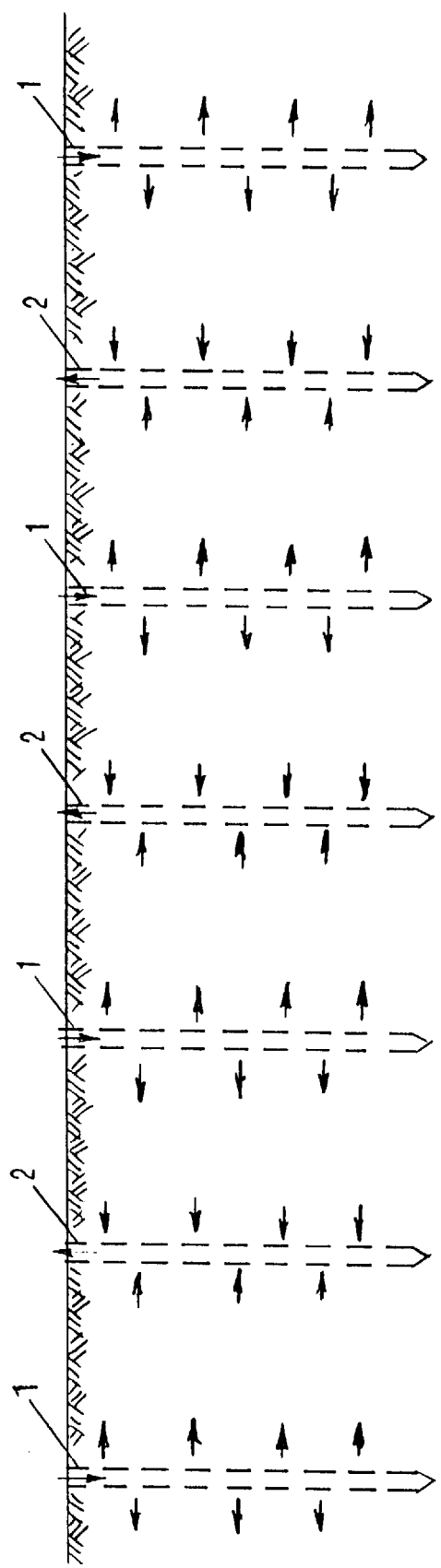
FIGS. 3b, c show a section along line III representing extraction wells of the same length, respectively, shorter than the injection wells.
Figure 3C:
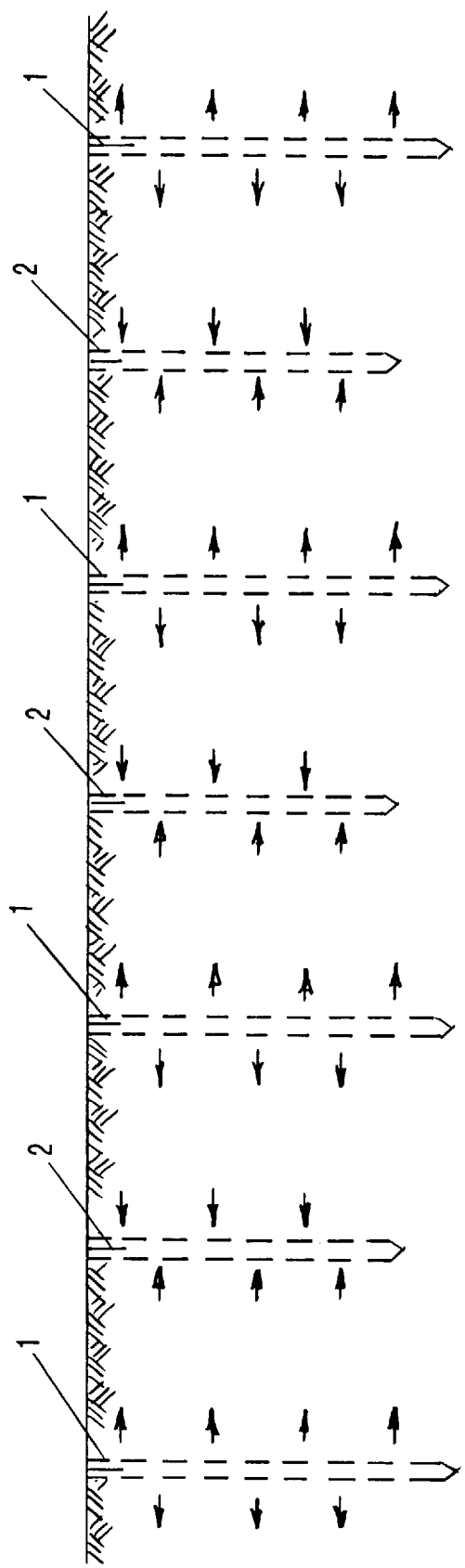
FIG. 3a shows schematically an arrangement of alternating rows of injection and extraction wells.

The injection and extraction wells may be positioned as desired depending on the local conditions at the contamination site. Preferred arrangements are, for example, the placement of one central extraction well that is surrounded by a plurality of injection wells positioned on the corners of a polygon (see FIGS. 2a–2c). This is especially suitable for small contamination sites. Other arrangements include, for example, the linear arrangement of injection wells in a number of preferably parallel rows with the placement of the extraction wells between the rows (see FIG. 3a) so as to be preferably equally spaced from the injection wells of the neighboring rows. In these arrangements the injection wells and extraction wells extend essentially vertically parallel into the soil whereby the extraction wells may end at the same level as the free ends of the injection wells or may be shorter (see FIGS. 2b, 2c, 3b and 3c). It is also possible to position the extraction well(s) atop the injection wells by providing a network of connecting lines covering the area of the injection well grid structure that are connected to at least one common extraction well. When such an arrangement is used, the air that is injected into the soil is forced to migrate upwardly through the entire vadose zone to the extraction lines that are positioned close to the soil surface. When injection wells and extraction wells are positioned parallel to one another in the vertical direction within the vadose zone, the air is forced to travel horizontally or at an acute angle to the nearest extraction well. The placement and positioning of the injection and extraction wells is, of course, greatly dependent on the site characteristics, in particular, on the type of soil, the accessability, respectively, obstruction by buildings etc.

The inventive apparatus may be used at the contamination site or, in the alternative, may be used within a containment structure, when it is unfeasible to position the remediation system at the contamination site. In this case, the contaminated soil will be excavated and placed into a containment structure, be it a container or vessel or a landfarm structure that is essentially sealed in a conventional manner, and the injection and extraction wells with the return line and other components of the apparatus will be installed at the containment structure.

DESCRIPTION OF PREFERRED EMBODIMENTS

The present invention will now be described in detail with the aid of several specific embodiments utilizing the only figure.

FIG. 1 is a schematic representation of the inventive apparatus. FIG. 1 shows a plurality of injection wells 1 which are placed in the vadose zone V below the surface S. The injection wells 1 are connected to a common inlet line 1a and are made of a perforated material to allow passage of the oxygen-containing gas, for example, air, into the soil, but prevent introduction of soil into the wells. The material to be used for the injection wells may be stainless steel or any other suitable metal or plastic material, for example, PVC, as is well known in the art. Extraction well(s) are made of the same material.

In the shown embodiment, the extraction well 2 has a collecting line 2a which is positioned above the injection wells 1 so that the flow of oxygen-containing gas (air) is forced from the bottom of the injection wells 1 upwardly into the collecting line 2a. Of course, the shown embodiment is only a simplified illustration and more collecting lines may be provided depending on the size of the remediation system. The outlet 2b of the extraction well 2 is connected with a return line 3 to the inlet 1b of the injection well. Within the return line 3 an air circulating pump 4 is provided which forces the oxygen-containing gas, i.e., air, into the injection wells 1 and which generates a vacuum at the outlet 2a of the extraction line 2 thereby recirculating the oxygen-containing gas, i.e., air, as return gas through the system. The apparatus further comprises an air intake 5 with regulator 5a with an air filter 5b for supplying air into the system. Between air intake 5 and the return line 3 a heat exchanger 6 is preferably provided for heating the intake air before release into the return line 3. Preferably, the return line 3 is also provided with a heat exchanger 3a for maintaining the return air at the desired temperature level. It should be noted that with this system the air injected into the injection wells 1 is extracted via the extraction well 2 and recycled (return gas) without venting to the atmosphere so that it is ensured that the entire amount of recovered air from the soil is reintroduced into the soil. Volatile components of the contamination extracted with the air through the extraction well thus cannot escape into the atmosphere and are returned for further remediation into the soil.

The apparatus further comprises a biological medium reservoir 7 in which a biological medium B, i.e., bacteria or microbes preferably in an aqueous solution that may or may not contain additives such as nutrients or other beneficial components, are stored. The biological medium reservoir 7 is connected via a connecting line 7a and a medium injection pump 9 to the return line 3 upstream of the injection well inlet 1b. The connecting line 7a may also have an access or additive port 7b for introducing water or nutrients or other required compounds. The biological medium is preferably heated either by a heater that is provided at the medium reservoir or by a heat exchanger 7c positioned in the line 7a between the medium reservoir and the medium injection pump 9. The medium injection pump 9 is preferably provided with a jet nozzle for injecting, i.e., atomizing, the aqueous solution of biological medium into the air stream (return gas) circulating within the system. A check valve 9a is also suggested. Suitable bacteria, especially for hydrocarbon contamination, are for example, commercially available microorganisms, such as a combination products sold under the trademark Micatrol available from Probiotic Solutions, Tempe, Ariz., or M-1000 available from Micro-Bac, Austin, Tex.

The return line 3 may be provided with further access ports such as a monitoring port 10 or an additive port 11 for supplying nutrients and/or water to the recirculating air stream (return gas), if necessary. Nutrients may be required for maintaining the microbial population at a desired level. Water is an essential compound for the metabolism of the microbes and should be at a certain level within the soil. Especially in dry climates it is therefore necessary to supply moisture to the soil in order to keep the moisture level for the microbes at a suitable level.

During operation of the remediation process it is also necessary to replenish the oxygen content within the recirculating gas so that fresh air is introduced into the air stream as required. This is accomplished with the air intake 5 that is provided with a regulator 5a.

The injection and extraction wells are installed for the system shown in the drawing by digging a ditch to a depth at which the connecting line 1a for the injection wells 1 is to be positioned, drilling holes for the injection wells, installing the injection wells 1, connecting the injection wells to a common inlet line 1a, filling in the ditch partially, and placing the collecting line 2a that is to be connected to the extraction well 2. Afterwards the ditch is filled in and the above-ground elements are installed.

In other embodiments, in which injection wells and extraction wells are positioned in a grid-like structure (see FIGS. 3a–3c), bore holes are drilled and injection and extraction wells are installed in the conventional manner.

The method of the present invention functions as follows. After completion of installation of the system, air is introduced into the system via the air intake 5 and heated with the heat exchangers 6 and 3a provided within the system before introduction into the injection wells 1. The air circulation pump 4 pumps the intake air into the injection wells 1 and extracts the air from the extraction well 2 for recirculation as return gas. The medium tank 7 contains the biological medium B, preferably an aqueous solution, which is heated to a desired temperature and injected via the medium injection pump 9 into the air stream (return gas) at the inlet 1b of the injection wells 1. By atomizing the aqueous solution of the biological medium B it is ensured that the biological medium B is uniformly distributed within the air stream. Upon introduction into the soil the biological medium B, i.e., bacteria or microbes, begins to digest the contaminants. The air is continuously recirculated (return gas) through the system and replenished as needed with fresh air through the air intake 5 in order to ensure a substantially constant oxygen level. Furthermore, during recirculation the air (return gas) is maintained at a constant temperature level that is advantageous to the activity of the microbes within the soil. Throughout the remediation process biological medium is constantly and continuously supplied via the injection pump into the return air stream. This ensures that at all times within the soil an ample supply of microbes is present for degradation of the contaminants.

In the prior art it has been observed that during bioremediation a decrease in the rate of degradation occurs as a function of the destruction of the contamination which is the hydrocarbon food source for the microbes. This also results in a decrease of the microbial population. Therefore, it is suggested with the present invention to introduce a constant supply of microbes into the soil by continuously injecting biological medium into the inlet airstream (return gas). By doing so, it is ensured that the remediation takes place at a substantially constant rate and that no drop-off in the rate of remediation towards the end of the remediation process is observed. This also ensures that the remediation process takes place substantially faster than previously observed.

EXAMPLE

A fifty gallon drum was filled with sandy soil that was contaminated with 10,000 ppm diesel fuel. An injection well and an extraction well were installed spaced apart within the soil in the drum. A return line with an air circulation pump was connected between the inlet of the injection well and the outlet of the extraction well. The top of the drum was sealed off. A biological medium reservoir was connected to the return line in the vicinity of the injection well. An air intake was connected within the return line for replenishing oxygen. The aqueous biological medium (Micatrol, see above) was dripped into the injection well at a constant rate and air was continuously circulated through the system. The extracted air was returned through the return line into the injection well. Within two weeks the diesel fuel contamination was reduced from 10,000 ppm to 7,500 ppm. Within twelve weeks the contamination was further reduced to a level of 5,000 ppm. It has been generally observed and documented that reductions of diesel concentrations initiating at 10,000 ppm in soil can be reduced to less than 100 ppm in 9 to 15 months of system operation. For both sampling points bacteria counts were also performed. The results are: $1.1\times10^7$ colony forming units per gram for both sampling points, i.e., the number of microbes remains constant.

With the present invention an inexpensive and simple system for remediating soil of the vadose zone is provided. By providing a continuous supply of microbes within the soil and a controlled environment for the microbes due to ensuring a constant temperature and constant moisture level, the inventive bioremediation process takes place at a much faster speed than previously known.

The present invention is, of course, in no way restricted to the specific disclosure of the specification and drawings, but also encompasses any modifications within the scope of the appended claims.

What I claim is:

1. A method of remediating contamination in soils in the vadose zone, said method comprising the steps of:

establishing at least one injection well in the soil;

establishing at least one extraction well in the soil;

injecting oxygen-containing gas into said injection well;

applying a vacuum to said extraction well and extracting the oxygen-containing gas together with volatile contaminants, when present in the contamination, through said extraction well;

returning the oxygen-containing gas together with the volatile contaminants as return gas into said injection well and the soil; and continuously adding to the return gas a biological medium for introduction into the soil.

2. A method according to claim 1, further comprising the step of heating the oxygen-containing gas before said step of injecting oxygen-containing gas into said injection well.

3. A method according to claim 1, further comprising the step of heating the biological medium before said step of continuously adding a biological medium.

4. A method according to claim 1, further comprising the step of preparing an aqueous solution of the biological medium, wherein said step of continuously adding the biological medium includes the step of atomizing the aqueous solution of the biological medium.

5. A method according to claim 1, further comprising the step of heating the return gas.

6. A method according to claim 1, wherein said biological medium comprises microbes specifically designed to feed on the contaminants of the contamination.

7. A method according to claim 6, wherein the contaminants are petroleum hydrocarbons and wherein the microbes feed on petroleum hydrocarbons.

8. A method according to claim 1, wherein said step of returning includes the step of introducing virgin oxygen-containing gas into the return gas.

9. A method according to claim 8, further comprising the step of heating the virgin oxygen-containing gas.

10. A method according to claim 9, wherein the oxygen-containing gas is air, further comprising the step of filtering the air at the air intake.

11. A method according to claim 1, further comprising the step of supplying nutrients for the biological medium to the return gas.

12. A method according to claim 11, further comprising the step of preparing an aqueous solution of the nutrients, and wherein said step of supplying nutrients includes the step of atomizing the aqueous solution of the nutrients.

13. A method according to claim 11, further comprising the step of heating the nutrients before said step of supplying nutrients.

14. A method according to claim 1, further comprising the step of monitoring progress of the remediation.

15. A method according to claim 14, wherein said step of monitoring progress includes the step of sampling the return gas.

16. A method according to claim 1, further comprising the steps of arranging a plurality of said injection wells in a grid structure and connecting said plurality of said injection wells to at least one common inlet line.

17. A method according to claim 16, further comprising the step of positioning said extraction well above said injection wells and connecting substantially horizontally extending extraction lines to said extraction well to substantially cover the area of the grid structure.

18. A method according to claim 16, wherein said step of arranging a plurality of said injection wells includes the step of placing said injection wells so as to define the corners of a polygon, and further comprising the step of positioning said extraction well in the center of the polygon.

19. A method according to claim 18, further comprising the step of extending said extraction well vertically to a same level as free ends of said injection wells.

20. A method according to claim 18, further comprising the step of terminating said extraction well above a level of free ends of said injection wells.

21. A method according to claim 16, wherein said step of arranging a plurality of injection wells includes the step of placing said injection wells in parallel rows, and further comprising the step of positioning a plurality of said extraction wells in rows between adjacent ones of said parallel rows so as to be spaced uniformly from said injection wells of said adjacent ones of said parallel rows.

22. A method according to claim 21, further comprising the step of extending said extraction well vertically to a same level as free ends of said injection wells.

23. A method according to claim 21, further comprising the step of terminating said extraction wells above a level of free ends of said injection wells.

24. A method according to claim 1, further comprising the step of introducing moisture into the return gas.

25. A method according to claim 1, wherein said step of establishing at least one injection well in the soil includes placing said injection well into the vadose zone at a contamination site and wherein said step of establishing at least one extraction well in the soil includes placing said extraction well into the vadose zone at the contamination site.

26. A method according to claim 1, further comprising the steps of:

excavating the contaminated soil;

filling the contaminated soil into a containment structure before said steps of establishing at least one injection well and establishing at least one extraction well.

27. A method according to claim 26, wherein said containment structure is a container.

28. A method according to claim 26, wherein said containment structure is a landfarm structure.

29. An apparatus for remediating contamination in soils in the vadose zone, said apparatus comprising:

at least one injection well to be placed in the soil;

at least one extraction well to be placed in the soil;

means for injecting oxygen-containing gas into said injection well;

means for applying a vacuum to said extraction well and extracting the oxygen-containing gas together with contamination volatiles, when present in the contamination, through said extraction well;

a return line connecting said extraction well to said injection well for returning the oxygen-containing gas together with contamination volatiles, when present in the contamination, as a return gas into said injection well; and means for continuously adding to the return gas to be returned into said injection well a biological medium for introduction into the soil.

30. An apparatus according to claim 29, further comprising a heat exchanger connected within said return line for heating the return gas before return into said injection well.

31. An apparatus according to claim 29, further comprising a means for heating the biological medium.

32. An apparatus according to claim 29, further comprising a reservoir for holding the biological medium and a connecting line for connecting said reservoir to said return line, wherein said connecting line has a jet valve for injecting the biological medium into said return line.

33. An apparatus according to claim 29, further comprising an air intake with a filter connected to said return line, wherein said oxygen-containing gas is air.

34. An apparatus according to claim 33, further comprising a heat exchanger connected between said air intake and said return line.

35. An apparatus according to claim 29, wherein the biological medium comprises microbes specifically designed to feed on the contaminants of the contamination.

36. An apparatus according to claim 35, wherein the contaminants are petroleum hydrocarbons and wherein the microbes feed on petroleum hydrocarbons.

37. An apparatus according to claim 29, wherein said return line has a port for supplying nutrients.

38. An apparatus according to claim 37, further comprising a reservoir for the nutrients connected to said port, said reservoir having a means for heating the nutrients, and wherein said port has a jet valve for injecting the nutrients.

39. An apparatus according to claim 29, wherein said return line has at least one access port for monitoring.

40. An apparatus according to claim 29, wherein a plurality of said injection wells is arranged in a grid structure, and further comprising a common inlet line connected to said injection wells.

41. An apparatus according to claim 40, wherein said extraction well is positioned above said injection wells and comprises substantially horizontally extending extraction lines substantially covering the area of the grid structure.

42. An apparatus according to claim 40, wherein said injection wells are placed so as to define the corners of a polygon and wherein said extraction well is positioned in the center of the polygon.

43. An apparatus according to claim 42, wherein said extraction well extends vertically to a same level as free ends of said injection wells.

44. An apparatus according to claim 42, wherein said extraction well terminates above a level of free ends of said injection wells.

45. An apparatus according to claim 40, wherein said injection wells are placed in parallel rows and wherein a plurality of said extraction wells are positioned in rows between adjacent ones of said parallel rows so as to be spaced uniformly from said injection wells of said adjacent ones of said parallel rows.

46. An apparatus according to claim 45, wherein said extraction wells extends vertically to a same level as free ends of said injection wells.

47. An apparatus according to claim 45, wherein said extraction wells terminate above a level of free ends of said injection wells.

48. An apparatus according to claim 29, wherein said return line has a port for introducing moisture into the return gas.

49. An apparatus according to claim 29, wherein said at least one injection well is placed into the vadose zone at the contamination site and wherein said at least one extraction well is placed into the vadose zone at the contamination site.

50. An apparatus according to claim 29, further comprising a containment structure for receiving the soil and said at least one injection well and said at least one extraction well.

51. An apparatus according to claim 50, wherein said containment structure is selected from the group consisting of a container and a landfarm structure.

\* \* \* \* \*